US008483158B2

(12) United States Patent
Lin

(10) Patent No.: US 8,483,158 B2
(45) Date of Patent: Jul. 9, 2013

(54) METHOD AND APPARATUS FOR ALLOCATING UPLINK RESOURCE

(75) Inventor: Ko-Chiang Lin, Taipei (TW)

(73) Assignee: Innovative Sonic Corporation, Taipei City (TW)

( * ) Notice: Subject to any disclaimer, the term of this patent is extended or adjusted under 35 U.S.C. 154(b) by 392 days.

(21) Appl. No.: 12/813,478

(22) Filed: Jun. 10, 2010

(65) Prior Publication Data

US 2010/0316011 A1     Dec. 16, 2010

Related U.S. Application Data

(60) Provisional application No. 61/185,600, filed on Jun. 10, 2009.

(51) Int. Cl.
*H04W 4/00* (2009.01)
*H04W 28/04* (2009.01)
*H04W 72/04* (2009.01)

(52) U.S. Cl.
CPC ............. *H04W 28/04* (2013.01); *H04W 72/04* (2013.01)
USPC ........... 370/329; 370/337; 370/349; 455/450; 455/456.1

(58) Field of Classification Search
CPC .............................. H04W 28/04; H04W 72/04
USPC ............... 370/329, 337, 349; 455/450, 456.1
See application file for complete search history.

(56) References Cited

U.S. PATENT DOCUMENTS

| 2006/0192700 | A1* | 8/2006 | Hori | 341/100 |
| 2009/0022098 | A1* | 1/2009 | Novak et al. | 370/329 |

FOREIGN PATENT DOCUMENTS

| EP | 1 937 016 A1 | 6/2008 |
| WO | 2007109917 A1 | 10/2007 |

OTHER PUBLICATIONS

3GPP, R2-092870, "Report of receiving and modified E-MBMS service of UE", CATT, May 2009.
3GPP TS 36.331 V8.5.0 (Mar. 2009), "E-UTRA RRC Protocol specification (Release 8)".
3GPP, R2-092962, "MBMS Dynamic Scheduling", Huawei, May 2009.
3GPP TR 36.814 V0.4.1 (Feb. 2009), "Further Advancements for E-UTRA Physical Layer Aspects (Release 9)".
3GPP, R1-091875, "Control Signaling for Non-Contiguous UL Resource Allocations", Samsung, May 2009.
Pantech: "Further details on the non-contiguous UL RA scheme with limited clusters", 3GPP TSG-RAN WG1#61, R1-102835, May 10-May 14, 2010, XP050419995, Montreal, Canada.
Asustek: "Non-contiguous uplink resource allocation for LTE-A", 3GPP TSG RAN WG1 Meeting #60, R1-100996, Feb. 22-26, 2010, XP050418576, San Francisco, USA.
Pantech: "On the non-contiguous UL resource allocation", 3GPP TSG-RAN WG1#60, R1-100989, Feb. 22-Feb. 26, 2010, XP050418570, San Francisco, USA.

\* cited by examiner

*Primary Examiner* — Pao Sinkantarakorn
*Assistant Examiner* — Richard K Chang
(74) *Attorney, Agent, or Firm* — Blue Capital Law Firm, P.C.

(57) ABSTRACT

A method for allocating uplink resource in a network terminal of a wireless communication system includes informing a user equipment (UE) about resource allocation via a resource allocation field in a UL grant message, to indicate the UE to use M clusters out of N radio units to perform uplink transmission, wherein each of the M clusters includes at least one consecutive radio units, and the message indicates a starting location and an ending location of each of the M clusters.

26 Claims, 8 Drawing Sheets

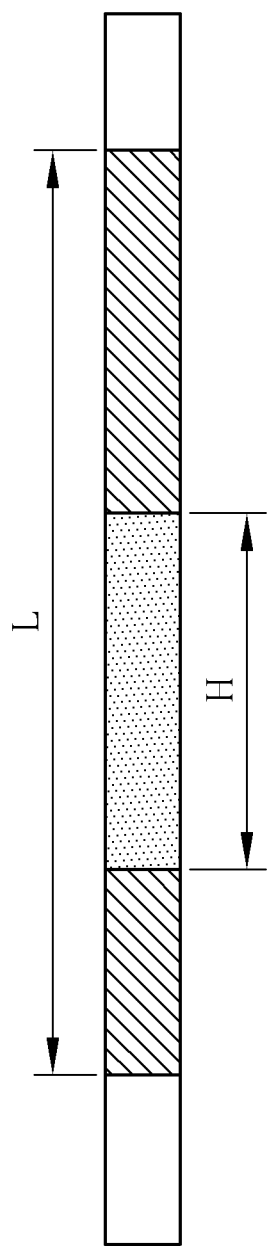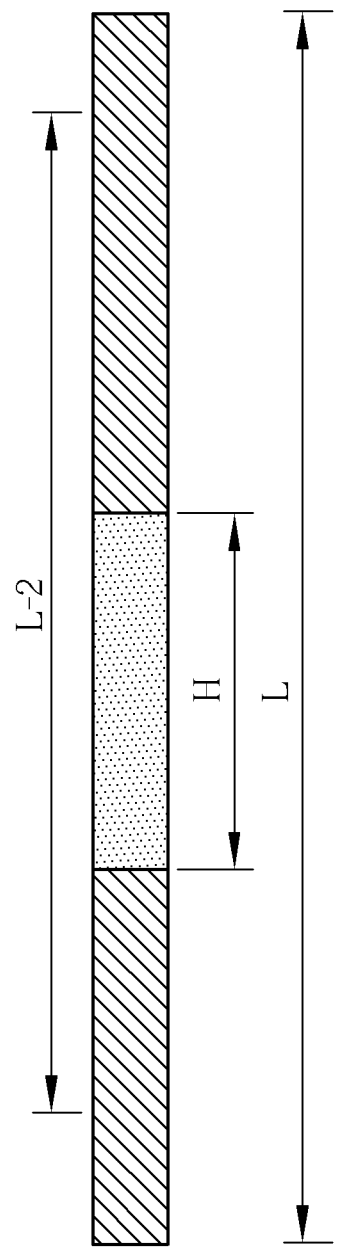

ns system.

METHOD AND APPARATUS FOR ALLOCATING UPLINK RESOURCE

CROSS REFERENCE TO RELATED APPLICATIONS

This application claims the benefit of U.S. Provisional Application No. 61/185,600, filed on Jun. 10, 2009 and entitled "Method and apparatus for handling eMBMS and measurement gap in a wireless communication system", the contents of which are incorporated herein by reference.

BACKGROUND OF THE INVENTION

1. Field of the Invention

The present invention relates to a method and apparatus for allocating uplink (UL) resource, and more particularly, to a method and apparatus for allocating UL resource in a network terminal of a wireless communication system, to realize non-contiguous UL resource allocation.

2. Description of the Prior Art

Long Term Evolution wireless communications system (LTE system), an advanced high-speed wireless communications system established upon the 3G mobile telecommunications system, supports only packet-switched transmission, and tends to implement both Medium Access Control (MAC) layer and Radio Link Control (RLC) layer in one single communication site, such as in Node B alone rather than in Node B (NB) and RNC (Radio Network Controller) respectively, so that the system structure becomes simple.

However, in order to meet requirements of all kinds of future services, the 3rd Generation Partnership Project (3GPP) has started to work out a next generation of the LTE system: LTE Advanced (LTE-A) system, to support wider transmission bandwidths, e.g. up to 100 MHz and for spectrum aggregation. Core technology of the LTE-A system and the LTE system is Orthogonal Frequency-Division Multiplexing (OFDM), which utilizes Orthogonal Frequency Division Multiple Access (OFDMA) for downlink (DL) transmission, and Single Carrier Frequency Division Multiple Access (SC-FDMA) for uplink transmission, so as to reduce power consumption.

In the LTE-A system, an eNB (evolved NB) can provides UL/DL transmission services to multiple mobile terminals at the same time, and thus has to effectively allocate limited transmission time and bandwidth resources to all mobile terminals, to ensure each mobile terminal can efficiently complete required transmission. A resource block (RB) is a unit for transmission resource allocation, and is allocated by a network terminal to user equipments (UEs). Each resource block comprises a plurality of resource elements, and a resource element is corresponding to an OFDMA symbol in DL transmission, while corresponding to an SC-FDMA symbol in UL transmission. Besides, a specific number of resource blocks can further compose a resource block group (RBG), which can be utilized as a unit for resource allocation as well.

Conventionally, the LTE-A system supports contiguous UL resource allocation, i.e. the network terminal allocates multiple contiguous UL resource blocks to one UE. However, the contiguous resource allocation cannot meet all kinds of requirements in the UL transmission, and thus industry evolves toward non-contiguous UL resource allocation.

In the non-contiguous UL resource allocation, the network terminal allocates more than one resource block cluster to a UE for UL transmission. Under such a condition, factors, such as a length, a number, a starting location and an ending location of a cluster, cause resource allocation becoming various and complex. Therefore, how to effectively allocate non-contiguous UL resources has become an issue in the industry.

SUMMARY OF THE INVENTION

It is therefore an objective of the present invention to provide a method and apparatus for allocating uplink resource in a network terminal of a wireless communication system.

The present invention discloses a method for allocating uplink (UL) resource in a network terminal of a wireless communication system. The method includes steps of informing a user equipment (UE) about resource allocation with a resource allocation field in a UL grant message, to indicate the UE to use M clusters out of N radio units to perform uplink transmission. Each of the M clusters comprises at least one contiguous radio units, and the UL grant message indicates a starting location and an ending location of each of the M clusters.

The present invention further discloses a communication device for allocating uplink resource in a network terminal of a wireless communication system. The communication device includes a processor, for executing a program, and a memory, coupled to the processor, for storing the program. The program includes steps of informing a user equipment (UE) about resource allocation with a resource allocation (RA) field in a UL grant message, to indicate the UE to use M clusters out of N radio units to perform uplink transmission. Each of the M clusters comprises at least one contiguous radio units, and the UL grant message indicates a starting location and an ending location of each of the M clusters.

The present invention further discloses a method for allocating uplink resource in a network terminal of a wireless communication system. The method includes steps of informing a user equipment (UE) about resource allocation with a resource allocation field in a UL grant message, to indicate the UE to use K clusters out of N radio units to perform uplink transmission. Each of the K clusters comprises at least one contiguous radio units, and the UL grant message indicates a contiguous valid range and (K−1) contiguous invalid ranges in the N radio units, whereas the K clusters is formed by the contiguous valid range excluding the (K−1) contiguous invalid ranges.

The present invention further discloses a communication device for allocating uplink resource in a network terminal of a wireless communication system. The communication device includes a processor, for executing a program, and a memory, coupled to the processor, for storing the program. The program includes steps of informing a user equipment (UE) about resource allocation with a resource allocation field in a UL grant message, to indicate the UE to use K clusters out of N radio units to perform uplink transmission. Each of the K clusters comprises at least one contiguous radio units, and the UL grant message indicates a contiguous valid range and (K−1) contiguous invalid ranges in the N radio units, whereas the K clusters is formed by the contiguous valid range excluding the (K−1) contiguous invalid ranges.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 7A and FIG. 7B are schematic diagrams of deciding two clusters according to the process of FIG. 6.

DETAILED DESCRIPTION

Figure 1:
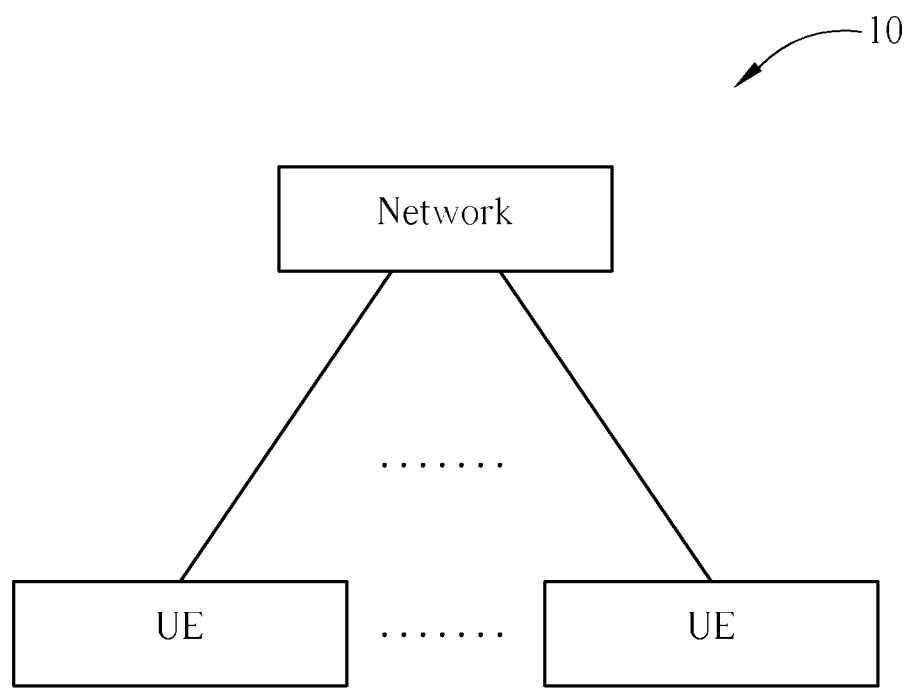
FIG. 1 is a schematic diagram of a wireless communications system.

Please refer to FIG. 1, which is a schematic diagram of a wireless communications system 10. The wireless communications system 10 is preferred to be an LTE-advanced (LTE-A) system, and is briefly composed of a network and a plurality of user equipments (UEs). In FIG. 1, the network and the UEs are simply utilized for illustrating the structure of the wireless communications system 10. Practically, the network may comprise a plurality of base stations (Node Bs), radio network controllers and so on according to actual demands, and the UEs can be devices such as mobile phones, computer systems, etc.

Figure 2:
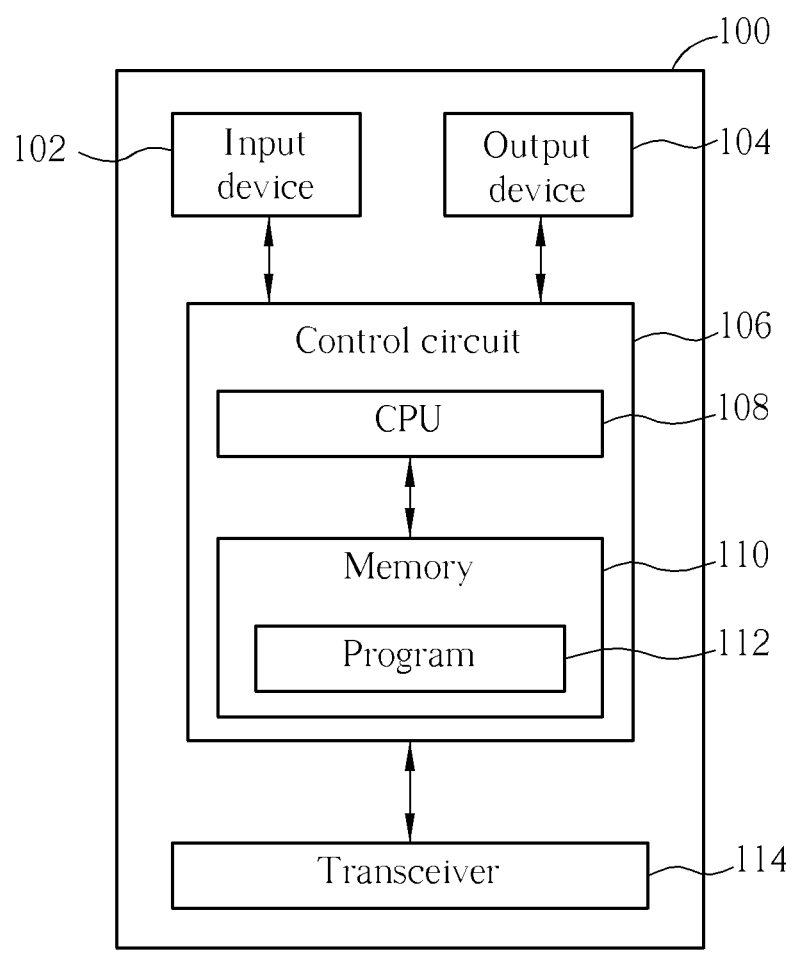
FIG. 2 is a function block diagram of a wireless communications device.

Please refer to FIG. 2, which is a functional block diagram of a communications device 100 in a wireless communications system. The communications device 100 can be utilized for realizing the network in FIG. 1. For the sake of brevity, FIG. 2 only shows an input device 102, an output device 104, a control circuit 106, a central processing unit (CPU) 108, a memory 110, a program 112, and a transceiver unit 114 of the communications device 100. In the communications device 100, the control circuit 106 executes the program code 112 in the memory 110 through the CPU 108, thereby controlling an operation of the communications device 100. The communications device 100 can receive signals inputted by a user through the input device 102, such as a keyboard, and can output images and sounds through the output device 104, such as a monitor or speakers. The transceiver unit 114 is used to receive and transmit wireless signals, for delivering received signals to the control circuit 106, and outputting signals generated by the control circuit 106 wirelessly. From a perspective of a communications protocol framework, the transceiver unit 114 can be seen as a portion of Layer 1, and the control circuit 106 can be utilized to realize functions of Layer 2 and Layer 3.

Figure 3:
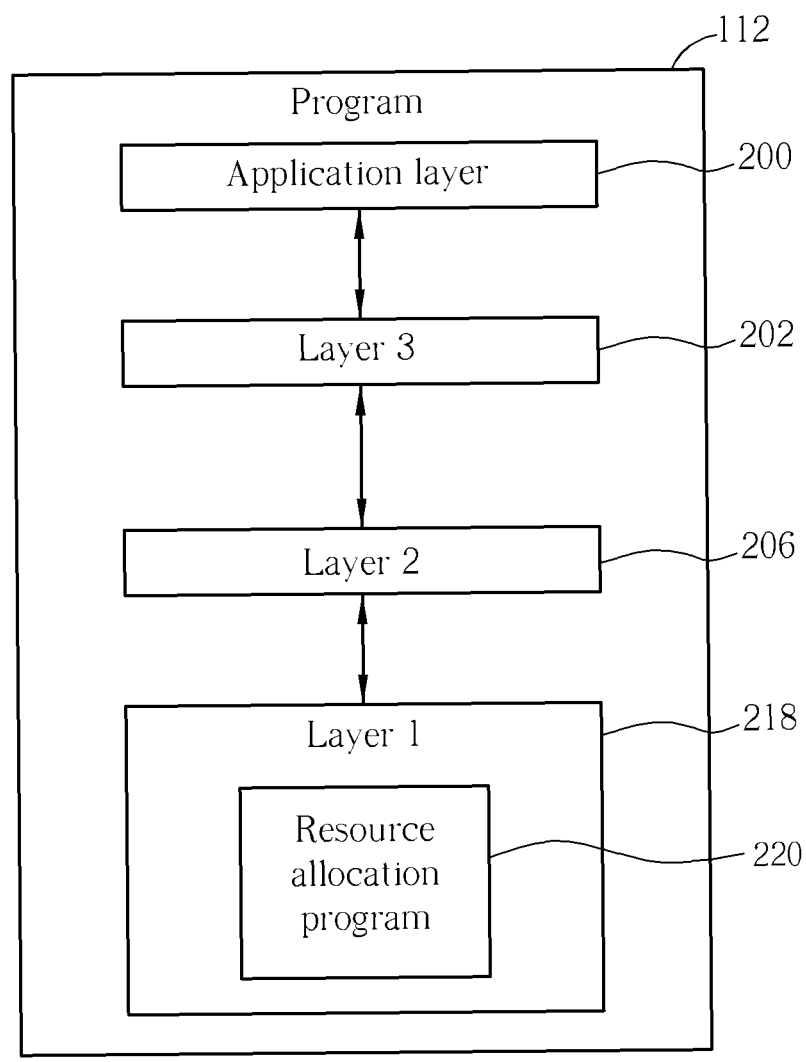
FIG. 3 is a schematic diagram of a program code of FIG. 2.

Please continue to refer to FIG. 3. FIG. 3 is a schematic diagram of the program 112 shown in FIG. 2. The program 112 includes an application layer 200, a Layer 3 202, and a Layer 2 206, and is coupled to a Layer 1 218. The Layer 3 202 performs radio resource control. The Layer 2 206 comprises a Radio Link Control (RLC) layer and a Medium Access Control (MAC) layer, and performs link control. The Layer 1 218 performs physical connections.

Since available transmission resources are limited, when a UE performs uplink transmission, a network terminal (the Layer 1 218) has to perform resource allocation, to ensure each transmission is completed. Under such a condition, the present invention provides a resource allocation program 220 in the Layer 1 218, and the resource allocation program 220 can realize non-contiguous UL resource allocation, such that the UE can use non-contiguous resource block clusters to perform uplink transmission.

Figure 4:
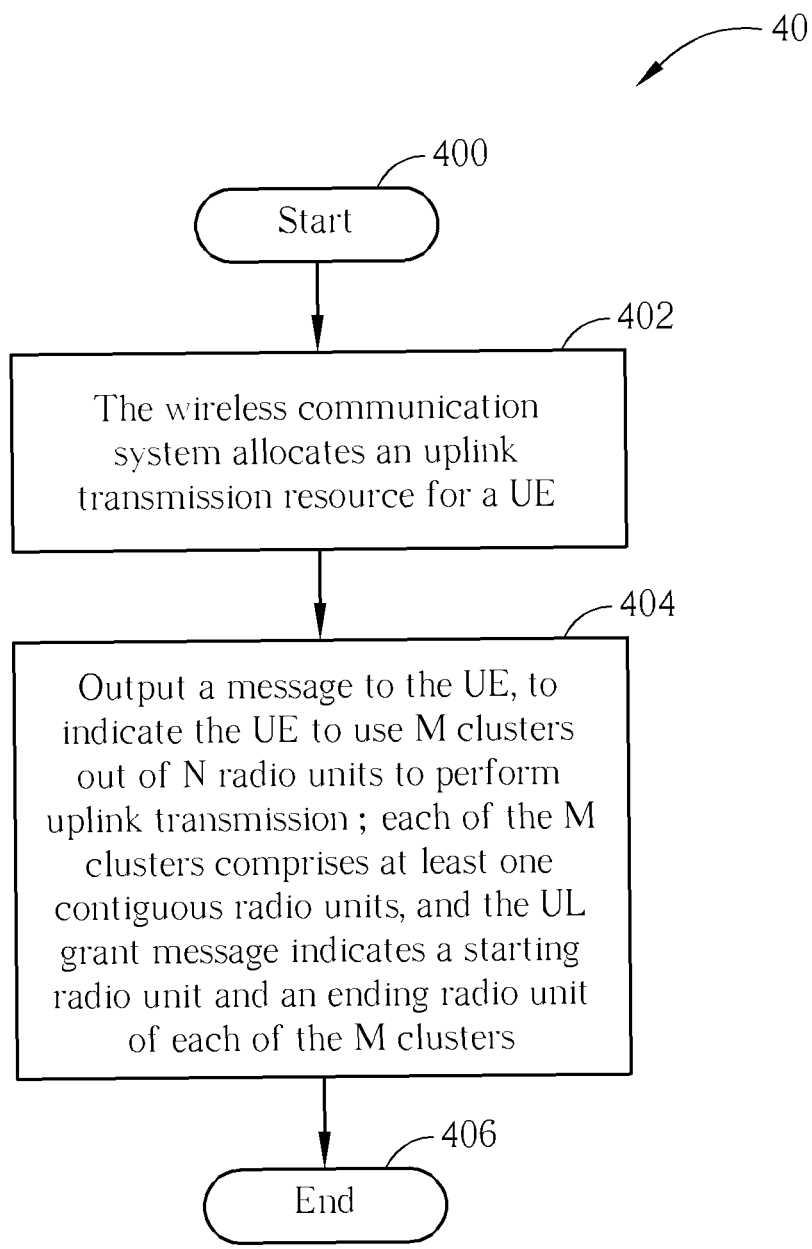
FIG. 4 is a schematic diagram of a process according to an embodiment of the present invention.

Please refer to FIG. 4, which is a schematic diagram of a process 40 according to an embodiment of the present invention. The process 40 is utilized for allocating uplink resource in a network terminal of the wireless communication system 10, and can be compiled into the resource allocation program 220. The process 40 includes the following steps:

Step 400: Start.

Step 402: The wireless communication system allocates an uplink transmission resource for a UE.

Step 404: Output a message to the UE, to indicate the UE to use M clusters out of N radio units to perform uplink transmission; each of the M clusters comprises at least one contiguous radio units, and the UL grant message indicates a starting radio unit and an ending radio unit of each of the M clusters.

Step 406: End.

According to the process 40, when a UE triggers an uplink transmission, the network terminal output a message, such as a UL grant message including a resource allocation field, to indicate starting locations and ending locations of M clusters selected from N radio units, such that the UE can use the M clusters to perform uplink transmission. In other words, when the network terminal intends to allocate M clusters for the UE to perform the uplink transmission, the embodiment of the present invention indicates 2M locations via a UL grant message, whereas M locations are corresponding to starting locations of the clusters, while other M locations are corresponding to ending locations of the clusters. Therefore, according to the embodiment of the present invention, the network terminal can indicate more than one cluster for the UE to perform uplink transmission, so as to realize non-contiguous UL resource allocation (Under some conditions, contiguous UL resource allocation can be realized as well).

Figure 5A:
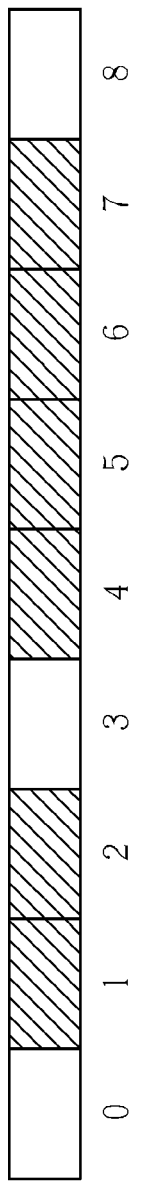
FIG. 5A to FIG. 5D are schematic diagrams of selecting two clusters out of nine radio units according to the process of FIG. 4.
Figure 5B:
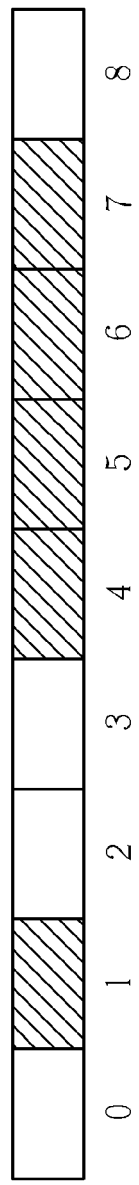
Figure 5C:
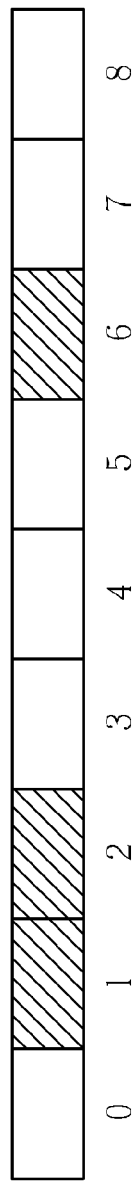
Figure 5D:
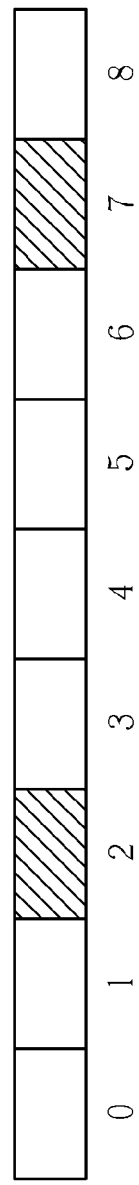

Noticeably, in the step 404, the radio units can be resource blocks, resource block groups or other units of resource allocation, and may not comprise UL bandwidth allocated for PUCCH. Besides, a method for the network terminal to select a cluster or the number, i.e. M, or locations of the clusters are not the subject matter of the present invention, and should be designed according to system requirements. For example, FIG. 5A to FIG. 5D are schematic diagrams of selecting two clusters out of nine radio units. In FIG. 5A to FIG. 5D, each block indicates a radio unit (i.e. a resource block or a resource block group), numbers 0~8 below the blocks indicate indexes of radio units, and slash areas indicate transmission resources allocated for the UE. As can be seen from FIG. 5A, clusters allocated by the network terminal are located at radio units 1~2 and radio units 4~7, respectively. Therefore, according to the embodiment of the present invention, an UL grant message outputted by the network terminal indicates four locations, i.e. the radio units 1, 2, 4, 7. By the same token, FIG. 5B to FIG. 5D illustrate similar operations. However, differences between FIG. 5A and FIG. 5B to FIG. 5D are that starting locations and ending locations of at least one clusters overlap in FIG. 5B to FIG. 5D, e.g. both a starting location and an ending location of a first cluster are located at the radio unit 1 in FIG. 5B.

As can be seen from FIG. 5A to FIG. 5D, under the same cluster number M, variation of starting locations and ending locations of clusters is very complex. In order to ensure the network terminal can correctly indicate the UE about resource allocation conditions (i.e. a starting location and an ending location of each cluster), the embodiment of the present invention further utilizes binominal coefficient, to map each resource allocation condition to a single value. In other words, the message outputted by the network terminal in the step 404 comprises the single value.

The binominal coefficient is well known by those skilled in the art, and LTE-A system also utilizes binominal coefficient encoding in Channel Quality Indication (CQI) process to indicate a location of a sub-band selected by the UE. Accordingly, assume that the UL grant message outputted by the network terminal in the step 404 is a value r, then:

$$r = \sum_{i=0}^{2M-1} \binom{N - s_i}{2M - i}, \quad \text{(eq. 1)}$$

where $\{s_i\}_{i=0}^{2M-1}$ indicates starting locations and ending locations of each cluster, and $$\binom{x}{y} = \begin{cases} \binom{x}{y} & x \geq y \\ 0 & x < y. \end{cases}$$

Or, assume that starting locations and ending locations of each of the M clusters located at M' locations:

$$r = r_{offset} + \sum_{i=0}^{M'-1} \binom{N - s_i}{M' - i}, \quad \text{(eq. 2)}$$

where $r_{offset}$ is corresponding to an overlap condition of starting locations and ending locations of the clusters, and $\{s_i\}_{i=0}^{M'-1}$ indicates M' locations.

In detail, in a binominal coefficient encoding equation, each resource allocation condition can be seen as a value in a number line, and when starting locations and ending locations of clusters overlap (as shown in FIG. 5B to FIG. 5D), an overlapping condition can be further indicated by an offset value. For example, if the example of FIG. 5A is expressed by eq. 2, M' is 4, $r_{offset}$ is 0; if the example of FIG. 5B is expressed by eq. 2, M' is 3, $r_{offset}$ is $$\binom{N+1}{4};$$

if the example of FIG. 5C is expressed by eq. 2, M' is 3, $r_{offset}$ is $$\binom{N+1}{4} + \binom{N+1}{3};$$

if the example of FIG. 5D is expressed by eq. 2, M' is 2, $r_{offset}$ is $$\binom{N+1}{4} + 2 * \binom{N+1}{3}.$$

Noticeably, utilizing binominal coefficient to indicate each selecting result is well known by those skilled in the art. However, the present invention can utilize other methods to indicate resource allocation conditions as well, and is not limited to this.

As can be seen from the above, according to the embodiment of the present invention, the network terminal can indicate more than one cluster for the UE to perform uplink transmission, so as to realize non-contiguous UL resource allocation.

Figure 6:
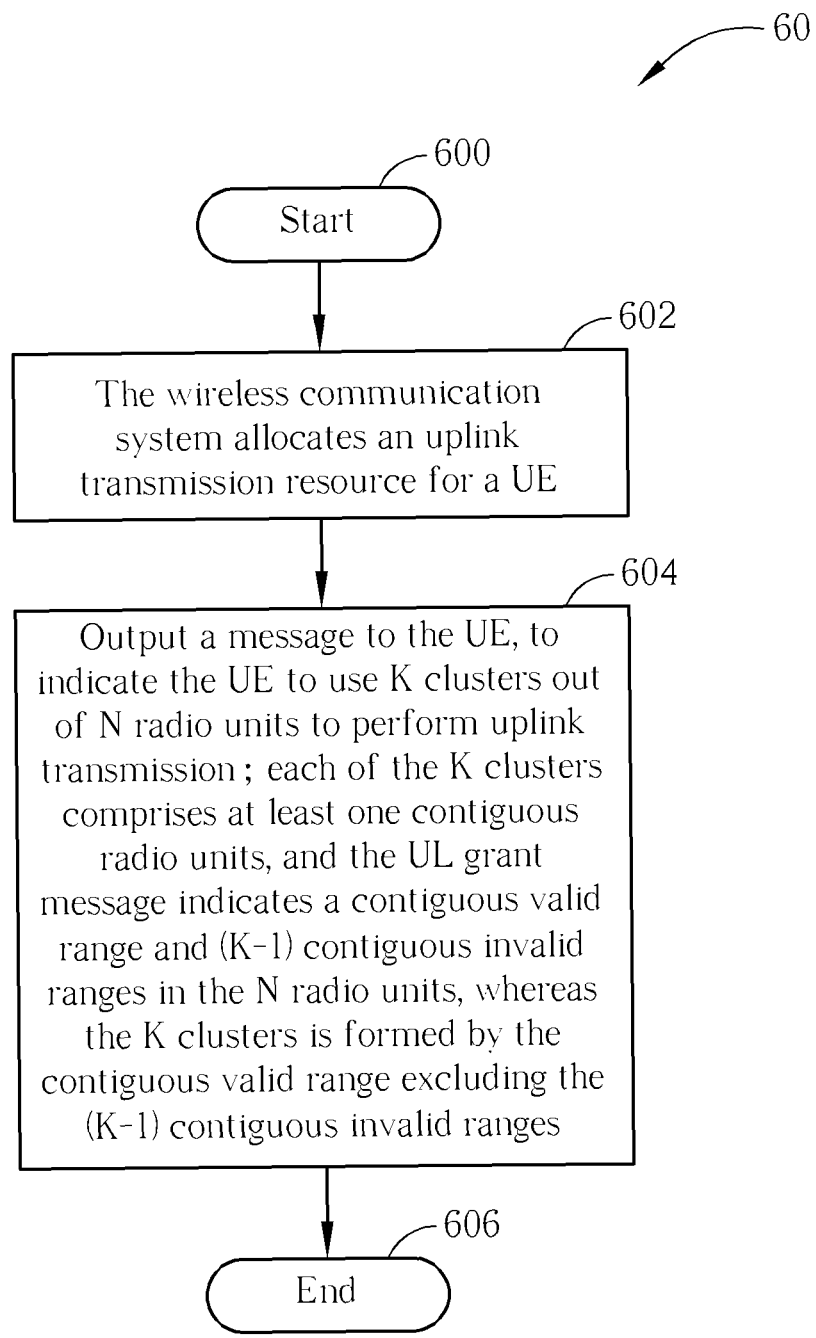
FIG. 6 is a schematic diagram of a process according to another embodiment of the present invention.

Please refer to FIG. 6, which is a schematic diagram of a process 60 according to an embodiment of the present invention. The process 60 is utilized for allocating uplink resource in a network terminal of a wireless communication system, and can be compiled into the resource allocation program 220. The process 60 includes the following steps:

Step 600: Start.

Step 602: The wireless communication system allocates an uplink transmission resource for a UE.

Step 604: Output a message to the UE, to indicate the UE to use K clusters out of N radio units to perform uplink transmission; each of the K clusters comprises at least one contiguous radio units, and the UL grant message indicates a contiguous valid range and (K−1) contiguous invalid ranges in the N radio units, whereas the K clusters is formed by the contiguous valid range excluding the (K−1) contiguous invalid ranges.

Step 606: End.

According to the process 60, when a UE triggers uplink transmission, the network terminal outputs a message, such as a UL grant message including a resource allocation field, to indicate a contiguous valid range and (K−1) contiguous invalid ranges in the N radio units, such that the UE can use the K clusters formed by the contiguous valid range excluding the (K−1) contiguous invalid ranges to perform uplink transmission. In other words, when the network terminal intends to allocate K clusters for the UE to perform uplink transmission, the embodiment of the present invention utilizes a UL grant message to indicate a contiguous valid range and (K−1) contiguous invalid ranges, so as to indicate locations of corresponding K clusters. Therefore, according to the embodiment of the present invention, the network terminal can indicate more than one cluster for the UE to perform uplink transmission, so as to realize non-contiguous UL resource allocation (Under some conditions, contiguous UL resource allocation can be realized as well).

Noticeably, in the step 604, the radio units are preferably resource block groups, or other units of resource allocation, and may not comprise UL bandwidth allocated for PUCCH. Besides, a method for the network terminal to select a cluster or the number, i.e. M, or locations of the clusters are not the subject matter of the present invention, and should be designed according to system requirements. Moreover, a length, a starting location and an ending location of the contiguous valid range, or the number, lengths, starting locations and ending locations of the contiguous invalid ranges affects a starting location and an ending location of each cluster, as well as resource allocation conditions. Therefore, in order to simplify content of the UL grant message outputted by the network terminal, the embodiment of the present invention further utilizes a resource indication value, to map each resource allocation condition to a single value.

The resource indication value is well known by those skilled in the art, and LTE-A system also utilizes similar technique for DL resource allocation. Accordingly, two conditions as shown in FIG. 7A and FIG. 7B are utilized for illustrating the concept. As to a first condition shown in FIG. 7A, i.e. a total length H of the contiguous invalid ranges is not greater than a length of the contiguous valid range, and the contiguous invalid ranges overlap with the contiguous valid range. Assume that the message outputted by the network terminal in the step 604 is a value RIV', and a length of the contiguous valid range is L, then:

$$RIV'=RIV_{offset}+RIV,$$

where $RIV_{offset}$ is an offset value, RIV is a resource indication value (RIV), for indicating the total length H and starting locations of all possible contiguous invalid ranges. Furthermore, when the contiguous valid range starts from (a+1)th radio unit of the N radio units, then:

$$RIV_{offset} = \left(\sum_{i=1}^{L-1} \frac{(N+1-i)i(i+1)}{2}\right) + \frac{aL(L+1)}{2};$$

$$\text{or } RIV_{offset} = \left(\sum_{s=0}^{S-1} \frac{L_s(L_s+1)}{2}\right),$$

where S is a resource indication value corresponding to the contiguous valid range, and $L_s$ is a corresponding length of a contiguous valid range when a resource indication value is S.

As to a second condition shown in FIG. 7B, i.e. a length of the contiguous valid range is L, but a total length H of the contiguous invalid ranges is at most (L−2) contiguous invalid ranges, and the contiguous invalid ranges overlap in a middle of the contiguous valid range, whereas a length of the middle is (L−2), then:

$$RIV'=RIV_{offset}+RIV,$$

where $RIV_{offset}$ is an offset value, RIV is a resource indication value, for indicating the total length H and starting locations of all possible contiguous invalid ranges. Furthermore, when the contiguous valid range starts from (a+1)th radio unit of the N radio units, then:

$$RIV_{offset} = \left(\sum_{i=1}^{L-1} \frac{(N+1-i)(i-2)(i-1)}{2}\right) + \frac{a(L-2)(L-1)}{2};$$

$$\text{or } RIV_{offset} = \left(\sum_{s=0}^{S-1} \frac{(L_s-2)(L_s-1)}{2}\right),$$

where S is a resource indication value corresponding to the contiguous valid range, and $L_s$ is a corresponding length of a contiguous valid range when a resource indication value is S.

Figure 8:
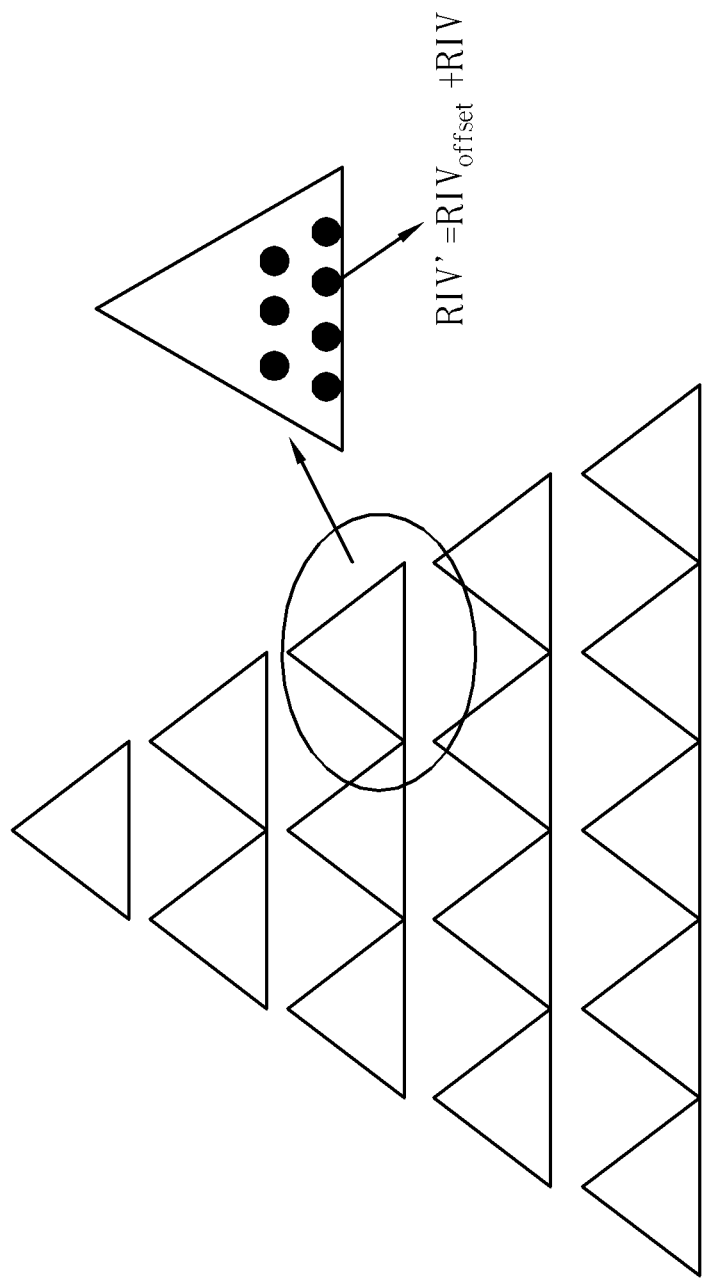
FIG. 8 is a schematic diagram of concept of a resource indication value.

The above two embodiments corresponding to the process 60 can further be illustrated by FIG. 8, where each triangle indicates a set of clusters generated by each different contiguous invalid range under a same contiguous valid range condition; different triangles in a same row indicate clusters of contiguous valid ranges with a same length but different locations; and different triangles in different rows indicates clusters of contiguous valid range with different lengths.

Noticeably, utilizing resource indication value to indicate each selecting result is well known by those skilled in the art. However, the present invention can utilize other methods to indicate resource allocation conditions as well, and is not limited to this.

As can be seen from the above, according to the embodiments of the present invention, the network terminal can indicate more than one cluster for the UE to perform uplink transmission, so as to realize non-contiguous UL resource allocation.

To sum up, as to uplink resource allocation for the LTE-A system, the present invention provides two realization methods. One is to indicate starting locations and ending locations of the M clusters. The other is to indicate a contiguous valid range and (K−1) contiguous invalid ranges to form K clusters. Therefore, the present invention can indicate more than one cluster for the UE to perform uplink transmission, so as to realize non-contiguous UL resource allocation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for allocating uplink (UL) resource in a network terminal of a wireless communication system, the method comprising:

informing a user equipment (UE) about resource allocation via a resource allocation field in a UL grant message, to indicate the UE to use M clusters out of N radio units to perform uplink transmission;

wherein each of the M clusters comprises at least one contiguous radio units, the UL grant message indicates a starting location and an ending location of each of the M clusters, the UL grant message uses a value (r) to indicate the starting location and the ending location of each of the M clusters, and the value (r) is a sum of binominal coefficients where $$r = \sum_{i=0}^{2M-1} \left\{ \begin{array}{c} N - s_i \\ 2M - i \end{array} \right\} \text{ in which } \{s_i\}_{i=0}^{2M-1}$$

indicates the starting location and the ending location of each cluster, and $$\left\{ \begin{array}{c} x \\ y \end{array} \right\} = \left\{ \begin{array}{cc} \left( \begin{array}{c} x \\ y \end{array} \right) & x \geq y \\ 0 & x < y. \end{array} \right.$$

2. The method of claim 1, wherein the N radio units are N resource blocks or N resource block groups, and may not comprise UL bandwidth allocated for PUCCH.

3. A method for allocating uplink (UL) resource in a network terminal of a wireless communication system, the method comprising:

informing a user equipment (UE) about resource allocation via a resource allocation field in a UL grant message, to indicate the UE to use M clusters out of N radio units to perform uplink transmission;

wherein each of the M clusters comprises at least one contiguous radio units, the UL grant message indicates a starting location and an ending location of each of the M clusters, some of starting locations and ending locations of the M clusters may overlap, the UL grant message comprises a value (r) to indicate the starting location and the eking location of each of the M clusters located at M' locations of the N radio units, and the value (r) is a sum of binominal coefficients plus an offset value where $$r = r_{offset} + \sum_{i=0}^{M'-1} \binom{N-s_i}{M'-i} \text{ in which } r_{offset}$$

corresponds to overlapping conditions of starting locations and ending locations of the M clusters, $\{s_i\}_{i=0}^{M'-1}$ indicates the M' locations, and $$\binom{x}{y} = \begin{cases} \binom{x}{y} & x \geq y \\ 0 & x < y. \end{cases}$$

4. The method of claim 3, wherein the cluster number M is equal to 2, and if all starting locations and ending locations of both clusters do not overlap, $r_{offset}$ is 0; if a previous cluster overlaps and a latter cluster does not overlap, $r_{offset}$ is $$\binom{N+1}{4};$$

if a previous cluster does not overlap and a latter cluster overlaps, $r_{offset}$ is $$\binom{N+1}{4} + \binom{N+1}{3};$$

if both two clusters do not overlap, $r_{offset}$ is $$\binom{N+1}{4} + 2*\binom{N+1}{3}.$$

5. A communication device for allocating uplink resource in a network terminal of a wireless communication system, the communication device comprising:
   a processor, for executing a program; and
   a memory, coupled to the processor, for storing the program, wherein the program comprises:
      informing, a user equipment (UE) about resource allocation via a resource allocation (RA) field in a UL grant message, to indicate the UE to use M clusters out of N radio units to perform uplink transmission;
   wherein each of the M clusters comprises at least one contiguous radio units, the UL grant message indicates a starting location and an ending location of each of the M clusters,
      the UL grant message uses a value (r) to indicate the starting location and the ending location of each of the M clusters, and
      the value (r) is a sum of binominal coefficients where $$r = \sum_{i=0}^{2M-1} \binom{N-s_i}{2M-i} \text{ in which } \{s_i\}_{i=0}^{2M-1}$$

indicates the starting location and the ending location of each cluster, and $$\binom{x}{y} = \begin{cases} \binom{x}{y} & x \geq y \\ 0 & x < y. \end{cases}$$

6. The communication device of claim 5, wherein the N radio units are N resource blocks or N resource block groups, and may not comprise UL bandwidth allocated for PUCCH.

7. A communication device for allocating uplink resource in a network terminal of a wireless communication system, the communication device comprising:
   a processor, for executing a program; and
   a memory, coupled to the processor, for storing the program, wherein the program comprises:
      informing a user equipment (UE) about resource allocation via a resource allocation (RA) field in a UL grant message, to indicate the UE to use M clusters out of N radio units to perform uplink transmission;
   wherein each of the M clusters comprises at least one contiguous radio units, and the UL grant message indicates a starting location and an ending location of each of the M clusters,
      some of the starting locations and ending locations of the M clusters may overlap,
      the UL grant message comprises a value (r) to indicate the starting location and the ending location of each of the M clusters located at M' locations of the N radio units, and
      the value (r) is a sum of binominal coefficients plus an offset value where $$r = r_{offset} + \sum_{i=0}^{M'-1} \binom{N-s_i}{M'-i}$$

in which $r^{offset}$ corresponds to overlapping conditions of starting locations and ending locations of the M clusters, $\{s_i\}_{i=0}^{M'-1}$ indicates the M' locations, and $$\binom{x}{y} = \begin{cases} \binom{x}{y} & x \geq y \\ 0 & x < y. \end{cases}$$

8. The communication device of claim 7, wherein the cluster number M is equal to 2, and if all starting locations and ending locations of both clusters do not overlap, if a previous cluster overlaps and a latter cluster does not overlap, $r_{offset}$ is $$\binom{N+1}{4};$$

if a previous cluster does not overlap and a latter cluster overlaps, $r_{offset}$ is $$\binom{N+1}{4} + \binom{N+1}{3};$$

if both two clusters do not overlap, $r_{offset}$ is $$\binom{N+1}{4}+2*\binom{N+1}{3}.$$

9. A method for allocating uplink resource in a network terminal of a wireless communication system, the method comprising:
informing a user equipment (UE) about resource allocation via a resource allocation field in a UL grant message, to indicate the UE to use K clusters out of N radio units to perform uplink transmission;
wherein each of the K clusters comprises at least one contiguous radio units, and the UL grant message indicates a contiguous valid range and (K−1) contiguous invalid ranges in the N radio units, whereas the K clusters, is formed by the contiguous valid range excluding the (K−1) contiguous invalid ranges,
a total length of the (K−1) contiguous invalid ranges is not greater than a length of the contiguous valid range, the (K−1) contiguous invalid ranges overlap within the contiguous valid range, and
the UL grant message comprises a value (RIV') to indicate the continuous valid range and the (K−1) contiguous invalid ranges located at a plurality of locations of the N radio units when the length of the contiguous valid range is L, where the value (RIV') is RIV'=RIV$_{offset}$+RIV in which RIV$_{offset}$ is an offset value and RIV is a resource indication value for indicating the total length and starting locations of all possible contiguous invalid ranges when the length of the contiguous valid range is L.

10. The method of claim 9, wherein RIV$_{offset}$ is decided by letting all possible RIV's indicating the lengths and starting locations of all contiguous valid range without overlap.

11. The method of claim 9, wherein $$RIV_{offset} = \left(\sum_{i=1}^{L-1} \frac{(N+1-i)i(i+1)}{2}\right) + \frac{aL(L+1)}{2}$$

when the contiguous valid range starts from (a+1)th radio unit of the N radio units.

12. The method of claim 9, wherein $$RIV_{offset} = \left(\sum_{s=0}^{S-1} \frac{L_s(L_s+1)}{2}\right).$$

13. The method of claim 9, wherein the N radio units are N resource block groups, and may not comprise UL bandwidth allocated for PUCCH.

14. A method for allocating uplink resource in network terminal of a wireless system, the method comprising:
informing a user equipment (UE) about resource allocation via a resource allocation field in a UL grant message, to indicate the UE to use K clusters out of N radio units to uplink transmission;
wherein each of the K clusters comprises at toast one contiguous radio units, and the UL grant message indicates a contiguous valid range and (K−1) contiguous invalid ranges in the N radio units, where the K clusters is formed by the valid range excluding the (K−1) contiguous invalid ranges,
a total length of the (K−1) contiguous invalid ranges is at most (L−2) when length of the contiguous valid range is L, and the (K−1) contiguous invalid ranges overlap within a middle of the contiguous valid range, whereas a length of the middle is (L−2), and
the UL grant message comprises a value (RIV') to indicate the contiguous valid range and the (K−1) contiguous invalid ranges located at a plurality of locations of the N radio units, where the value (RIV') is RIV'=RIV$_{offset}$+RIV in which RIV$_{offset}$ is an offset value and RIV is a resource indication value, for indicating the total length and starting locations of all possible contiguous invalid ranges within the middle.

15. The method of claim 14, wherein RIV$_{offset}$ is decided by letting all possible RIV's for indicating the lengths and starting locations of all contiguous valid range without overlap.

16. The method of claim 14, wherein $$RIV_{offset} = \left(\sum_{i=1}^{L-1} \frac{(N+1-i)i(i+1)}{2}\right) + \frac{aL(L+1)}{2}$$

when the contiguous valid range starts from (a+1)th radio unit of the N radio units.

17. The method of claim 14, wherein $$RIV_{offset} = \left(\sum_{s=0}^{S-1} \frac{(L_s-2)(L_s-1)}{2}\right).$$

18. A communication device for allocating uplink resource in a network terminal of a wireless communication system, the communication device comprising:
a processor, for executing a program; and
a memory, coupled to the processor, for storing the program, wherein the program comprises:
informing a user equipment (UE) about resource allocation via a resource allocation field in a UL grant message, to indicate the UE to use K clusters out of N radio units to perform uplink transmission;
wherein each of the K clusters comprises at least one contiguous radio units, and the UL grant message indicates a contiguous valid range and (K−1) contiguous invalid ranges in the N radio units, whereas the K clusters is formed by the contiguous valid range excluding the (K−1) contiguous invalid ranges,
a total length of the (K−1) contiguous invalid ranges is not greater than a length of the contiguous valid range, and the (K−1) contiguous invalid ranges overlap within the contiguous valid range, and
the UL grant message comprises a value (RIV') to indicate the contiguous valid range and the (K−1) contiguous invalid ranges located at a plurality of locations of the N radio units when the length of the contiguous valid range is L, where the value (RIV') is RIV'=RIV$_{offset}$+RIV in which RIV$_{offset}$ is an offset value and RIV is a resource indication value for indicating the total length and starting locations of all possible continuous invalid ranges when the length of the contiguous valid range is L.

19. The communication device of claim 18, wherein RIV$_{offset}$ is decided by letting all possible RIV's for indicating the lengths and starting locations of all contiguous valid ranges without overlap.

20. The communication device of claim 18, wherein $$RIV_{offset} = \left( \sum_{i=1}^{L-1} \frac{(N+1-i)i(i+1)}{2} \right) + \frac{aL(L+1)}{2}$$

when the contiguous valid range starts from (a+1)th radio unit of the N radio units.

21. The communication device of claim 18, wherein $$RIV_{offset} = \left( \sum_{s=0}^{S-1} \frac{L_s(L_s+1)}{2} \right).$$

22. The communication device of claim 18, wherein the N radio units are N resource block groups, and may not comprise UL bandwidth allocated for PUCCH.

23. A communication device for allocating uplink resource in a network terminal of a wireless communication system, the communication device comprising:
  a processor, for executing a program; and
  a memory, coupled to the processor, for storing the program, wherein the program comprises:
    informing a user equipment (UE) about resource allocation via a resource allocation field in a UL grant message, to indicate the UE to use K clusters out of N radio units to perform uplink transmission;
    wherein each of the K clusters comprises at least one contiguous radio units, and the UL grant message indicates a contiguous valid range and (K−1) contiguous invalid ranges in the N radio units, whereas the K clusters is formed by the contiguous valid range excluding the (K−1) contiguous invalid ranges,
    a total length of the (K−1) contiguous invalid ranges is at most (L−2) when a length of the contiguous valid range is L, and the (K−1) contiguous invalid ranges overlap within a middle of the contiguous valid range, whereas a length of the middle is (L−2), and
    the UL grant message comprises a value (RIV') to indicate the contiguous valid range and the (K−1) contiguous invalid ranges located at a plurality of locations of the N radio units, where the value (RIV') is RIV'=RIV$_{offset}$+RIV in which RIV$_{offset}$ is an offset value and RIV is a resource indication value for indicating the total length and starting locations of all possible contiguous invalid ranges within the middle.

24. The communication device 23, wherein RIV$_{offset}$ is decided by letting all possible RIV's for indicating the lengths and starting locations of all contiguous valid range without overlap.

25. The communication device 23, wherein $$RIV_{offset} = \left( \sum_{i=1}^{L-1} \frac{(N+1-i)i(i+1)}{2} \right) + \frac{aL(L+1)}{2}$$

when the contiguous valid range starts from (a±1)th radio unit of the N radio units.

26. The communication device 23, wherein $$RIV_{offset} = \left( \sum_{s=0}^{S-1} \frac{(L_s-2)(L_s-1)}{2} \right).$$

* * * * *